Dec. 6, 1949  C. B. DALE  2,490,678
RECORD CHANGING PHONOGRAPH
Filed Aug. 30, 1943  9 Sheets-Sheet 1
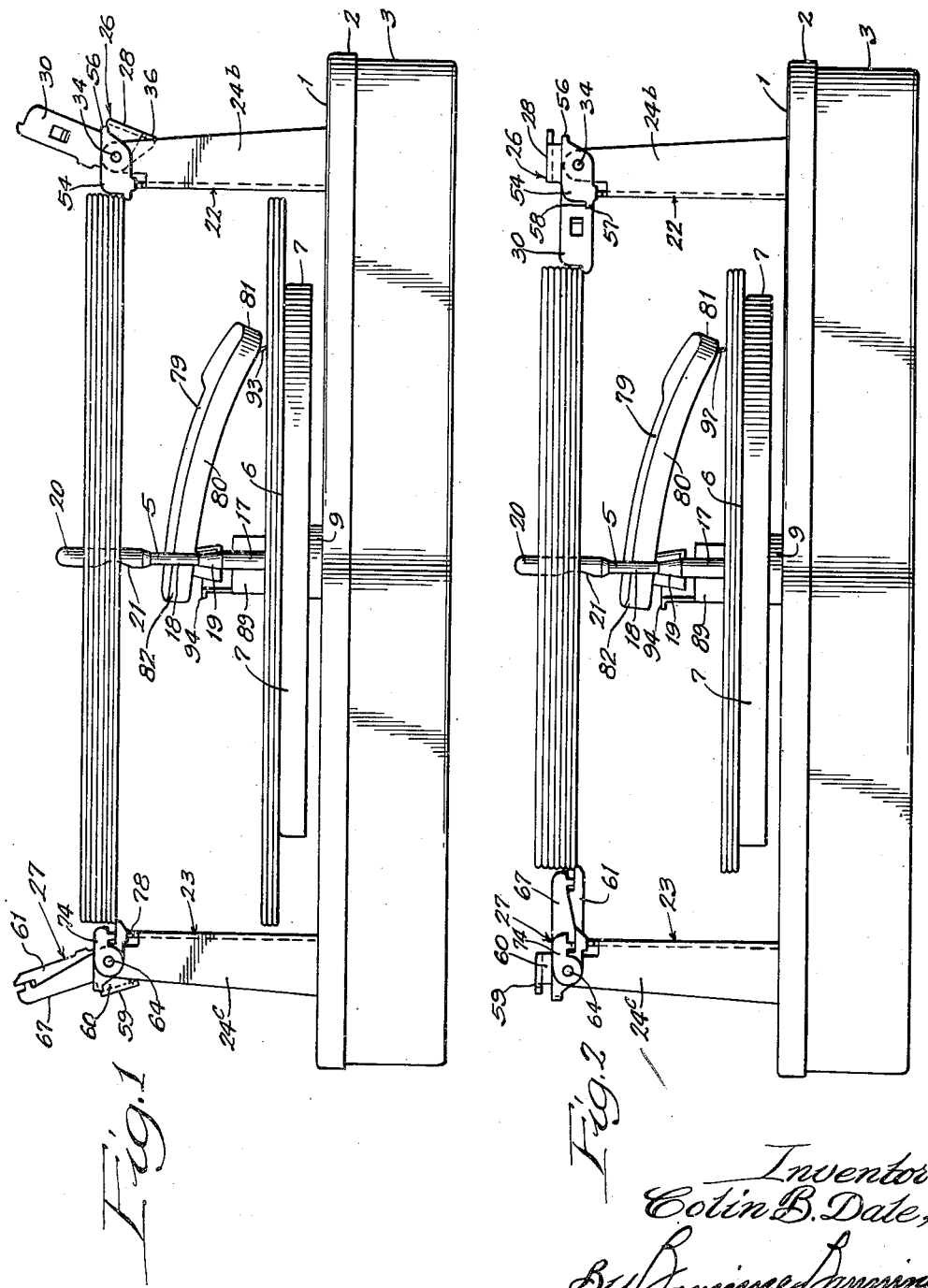

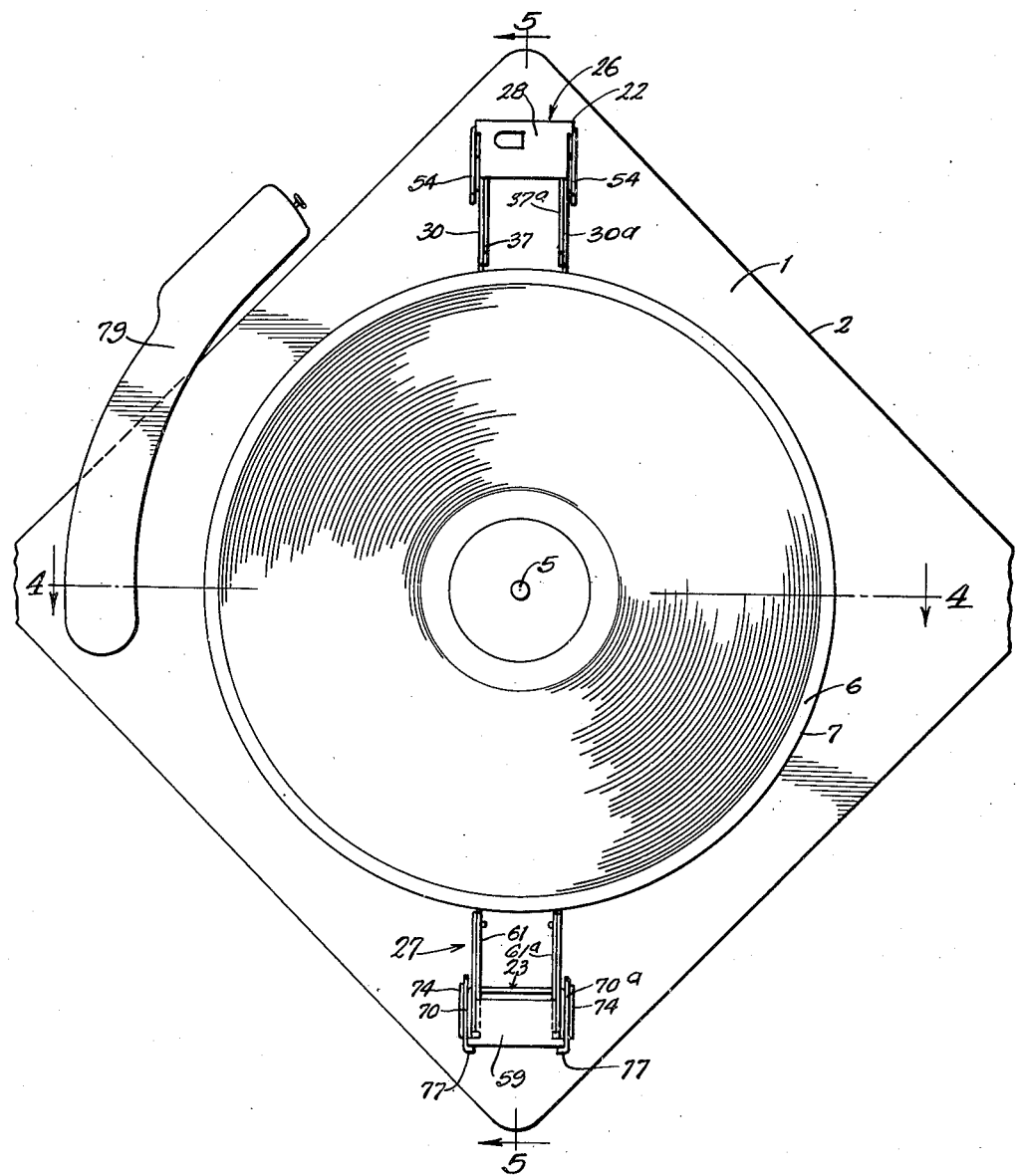

Dec. 6, 1949            C. B. DALE            2,490,678
RECORD CHANGING PHONOGRAPH
Filed Aug. 30, 1943                          9 Sheets-Sheet 3
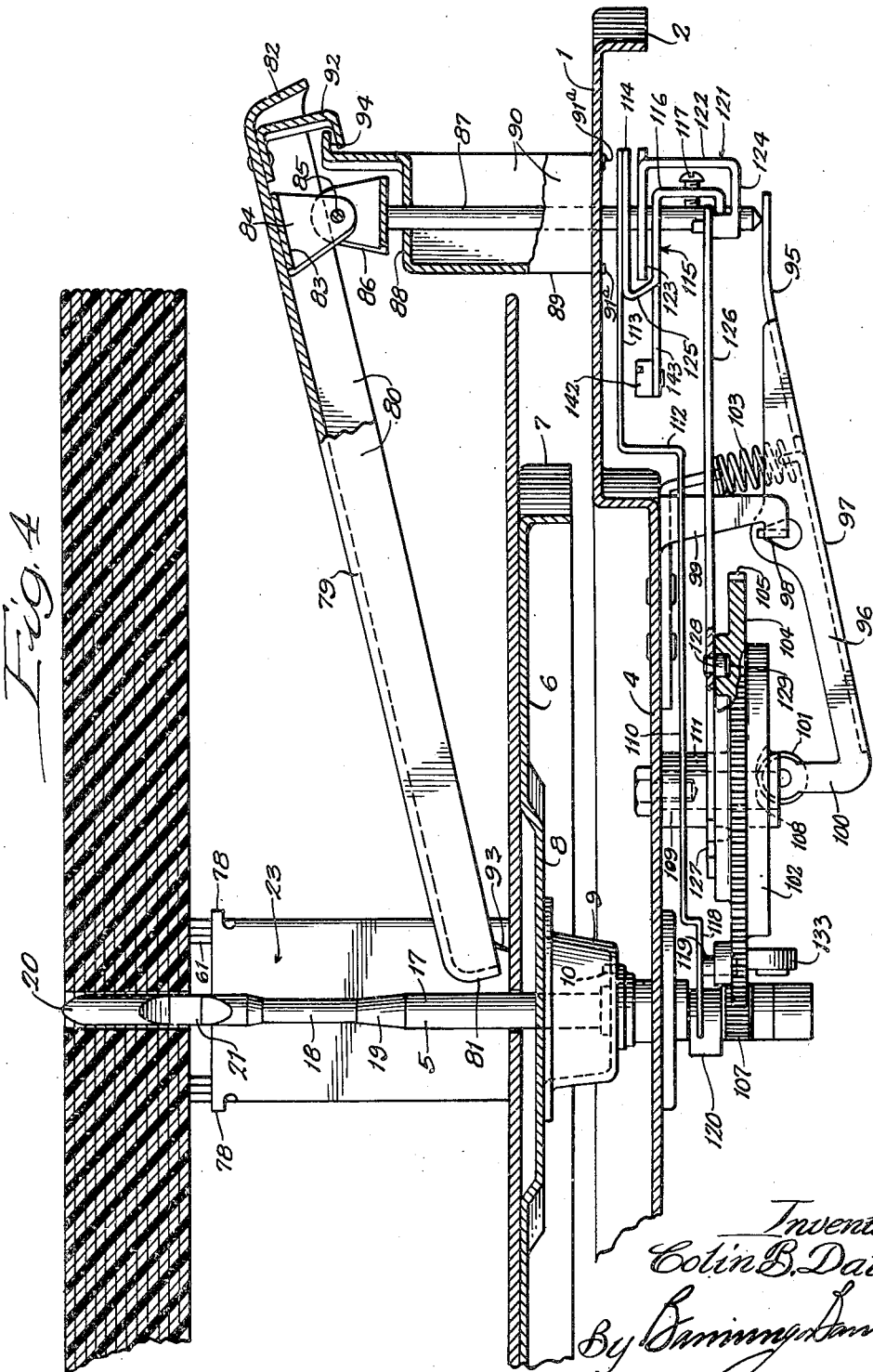

Dec. 6, 1949     C. B. DALE     2,490,678
RECORD CHANGING PHONOGRAPH
Filed Aug. 30, 1943     9 Sheets-Sheet 4

Inventor:
Colin B. Dale,
By Banning & Banning
Attorneys.

Dec. 6, 1949        C. B. DALE        2,490,678
RECORD CHANGING PHONOGRAPH
Filed Aug. 30, 1943        9 Sheets-Sheet 5
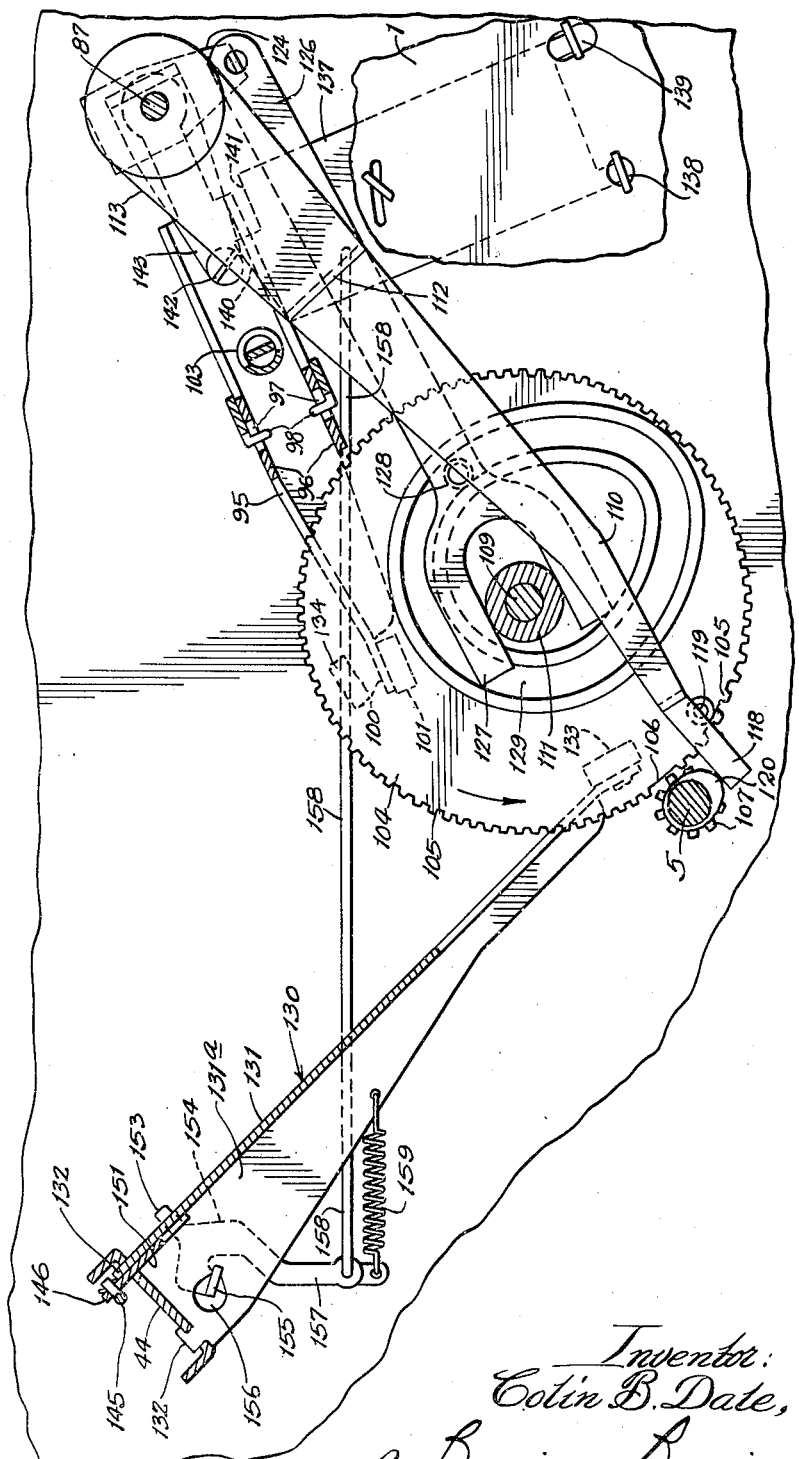

Dec. 6, 1949     C. B. DALE     2,490,678
RECORD CHANGING PHONOGRAPH
Filed Aug. 30, 1943     9 Sheets-Sheet 6
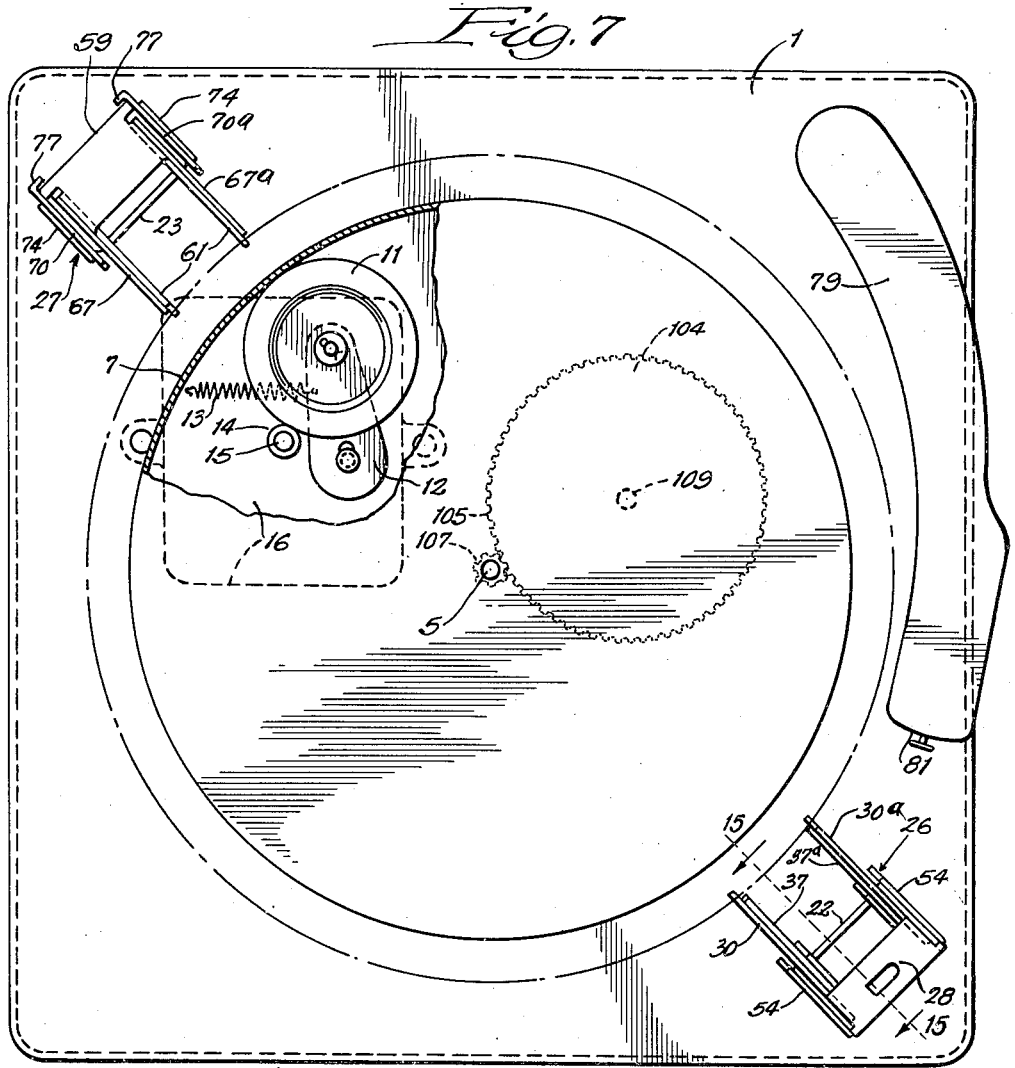
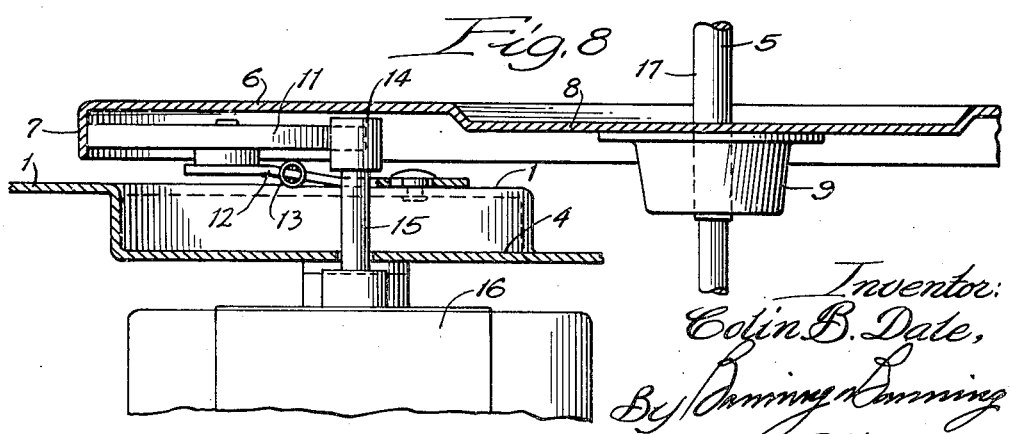
Inventor:
Colin B. Dale,
By Banning Banning
Attorneys.

Dec. 6, 1949     C. B. DALE     2,490,678
RECORD CHANGING PHONOGRAPH
Filed Aug. 30, 1943     9 Sheets-Sheet 7
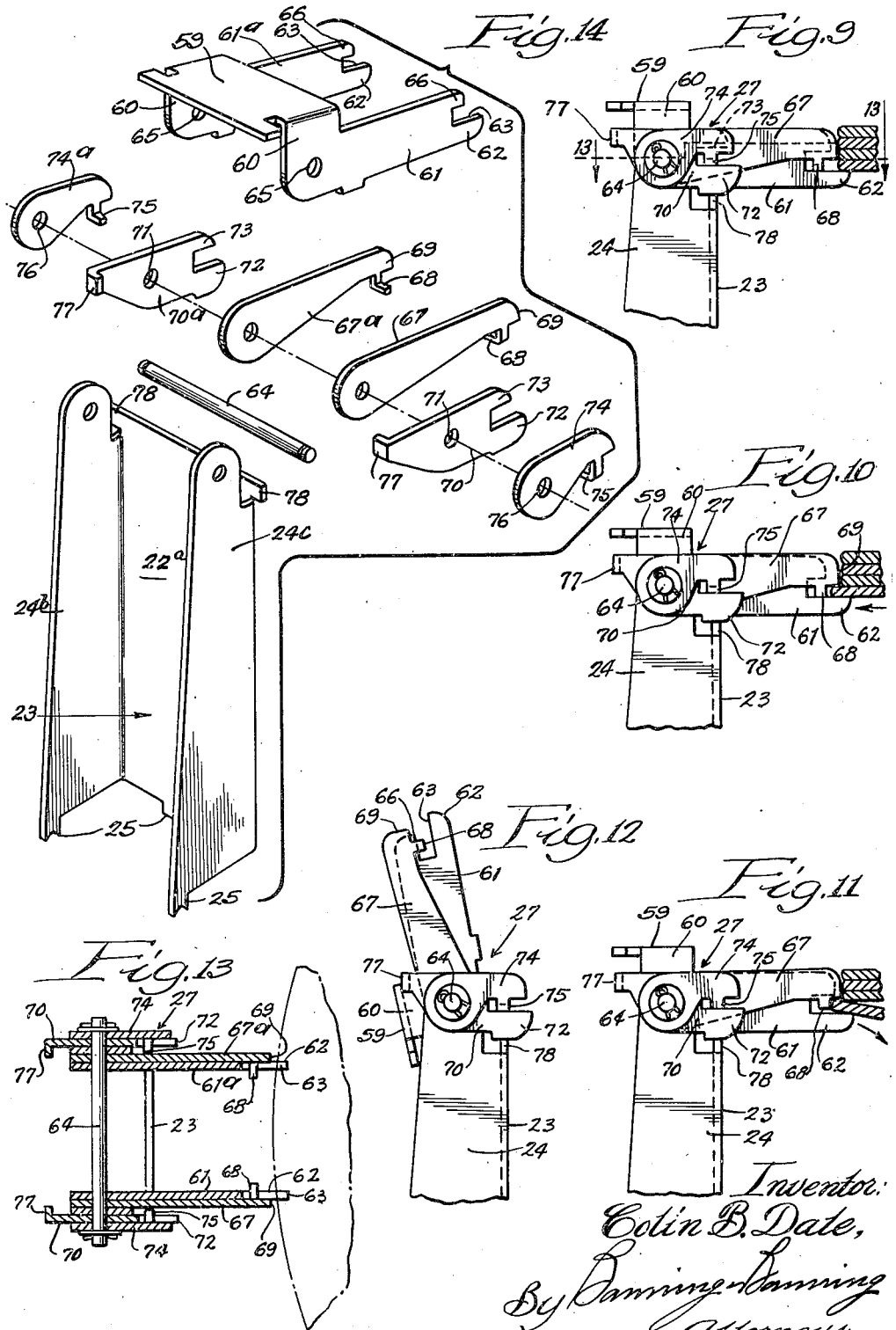
Inventor:
Colin B. Dale,
By Banning & Banning
Attorneys.

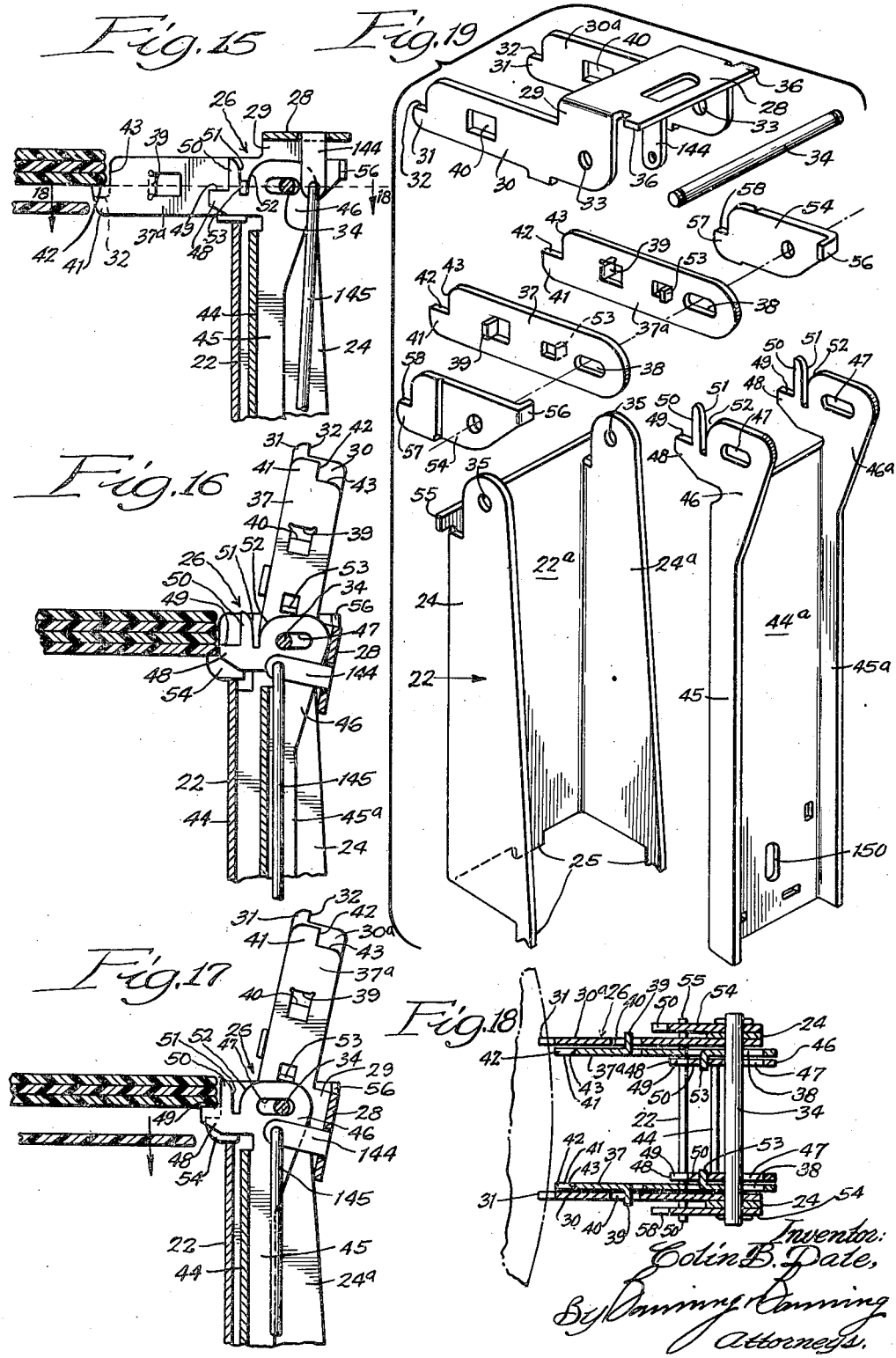

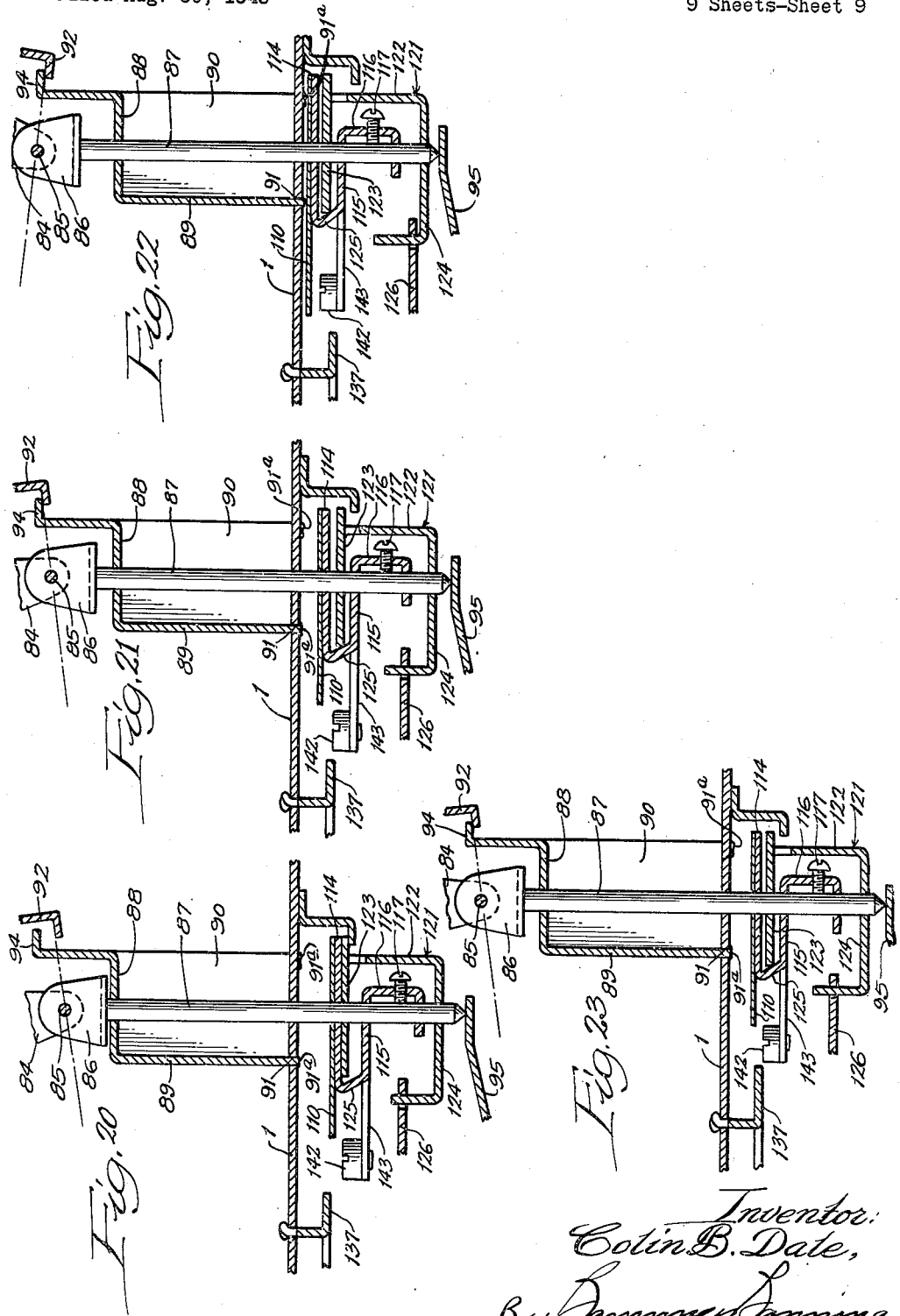

Patented Dec. 6, 1949

2,490,678

UNITED STATES PATENT OFFICE 2,490,678

RECORD CHANGING PHONOGRAPH

Colin B. Dale, Oak Park, Ill., assignor to Webster-Chicago Corporation, Chicago, Ill., a corporation of Illinois Application August 30, 1943, Serial No. 500,484

1 Claim. (Cl. 274—10)

This invention is directed to a phonograph of the type which makes provision for the support of a stack of phonographic record discs above the turn-table with provision for sequentially releasing the lowermost record disc while retaining the remainder of the stack in elevated position.

In a phonograph of this character, it is necessary to release the lowermost record disc during the interval of time while the tone arm is swung to its outermost position, so that it will not interfere with the dropping of the disc. It is also necessary to properly time the various operations so that as the tone arm travels inwardly under the guidance of the low-pitched record line, the overlying stack will be held elevated until the end of the record groove is reached and the tone arm is swung toward the center by a steeply pitched record guide line at the terminus of the operation, which terminal movement initiates the cycle of operations involved in the release of a new record. These operations, in sequence, consist in first elevating the tone arm to release the needle from contact with the record; second, in swinging the tone arm to its outermost position; third, in releasing a new record disc from the bottom of the stack; fourth, in swinging the tone arm inwardly to the limited extent necessary to engage the outermost convolutions of the new record groove; and fifth, in lowering the tone arm to bring the needle into engagement with the record groove. These operations require precise timing and the machine of the present invention makes adequate provision for such operations which are characteristic of the well-recognized type of phonograph to which the present invention belongs.

The special features to which the present invention is mainly directed relate to the mechanism provided for releasing the lowermost record disc from the stack by a kick-off operation which slides the record disc laterally to the extent necessary to release the adjacent edge from support, while at the same time making provision for the retention of the overlying record discs. With one edge thus released, the record disc will sag downwardly on the released side and thus effect its release from the opposite side which permits it to slide vertically down the rotating spindle which centers the record discs with relation to the turn-table.

The invention is directed to the means provided for supporting either 10-inch record discs or 12-inch record discs, as the case may be, and for the actuation of the associated kick-off finger regardless of the size of the record disc being played. The invention also relates to the formation of the rotating vertical spindle which is gouged away on one face to afford clearance for the lateral displacement of the record disc being released, and to the timing of the spindle to insure the opposition of the gouged face of the spindle toward the kick-off mechanism at the instant of release. Provision is also made for affording adequate clearance for permitting the distantly supported edge of the record disc when released to tilt momentarily on its support and thereafter freely release itself without chipping or gouging the edge of the record disc, while at the same time restricting the clearance space in such a way as to prevent the next overlying record disc on the stack from being laterally displaced at the moment of release.

The invention is also directed to the general structure of the machine which in the main is assembled from metal stampings which may be cut and shaped at a minimum of expense and which can be readily assembled and secured together without the provision of extraneous fastening devices such as bolts or rivets. While all portions of the machine are designed with a view to cheap quantity production, the structure throughout has been simplified to the greatest extent commensurate with its satisfactory operation.

Further objects and details will appear from a description of the invention in conjunction with the accompanying drawings wherein, Figure 1 is a side elevation of the complete machine adjusted for the release of 12-inch record discs;

Fig. 2 is a similar view of the machine adjusted for the release of 10-inch record discs;

Fig. 3 is a top plan view of the machine;

Fig. 4 is a sectional elevation of the operating parts taken on line 4—4 of Fig. 3 with the tone arm swung inwardly to its innermost position;

Fig. 6 is a detail partly in section showing one of the cams and connections for swinging the tone arm, together with mechanisms involved in the lifting of the tone arm spindle and the record releasing devices;

Fig. 7 is a plan view of the turn-table partly broken away and partly in section illustrating the friction drive and associated mechanisms;

Fig. 8 is a sectional detail illustrating the friction gearing for connecting the motor with the turntable;

Figure 5:
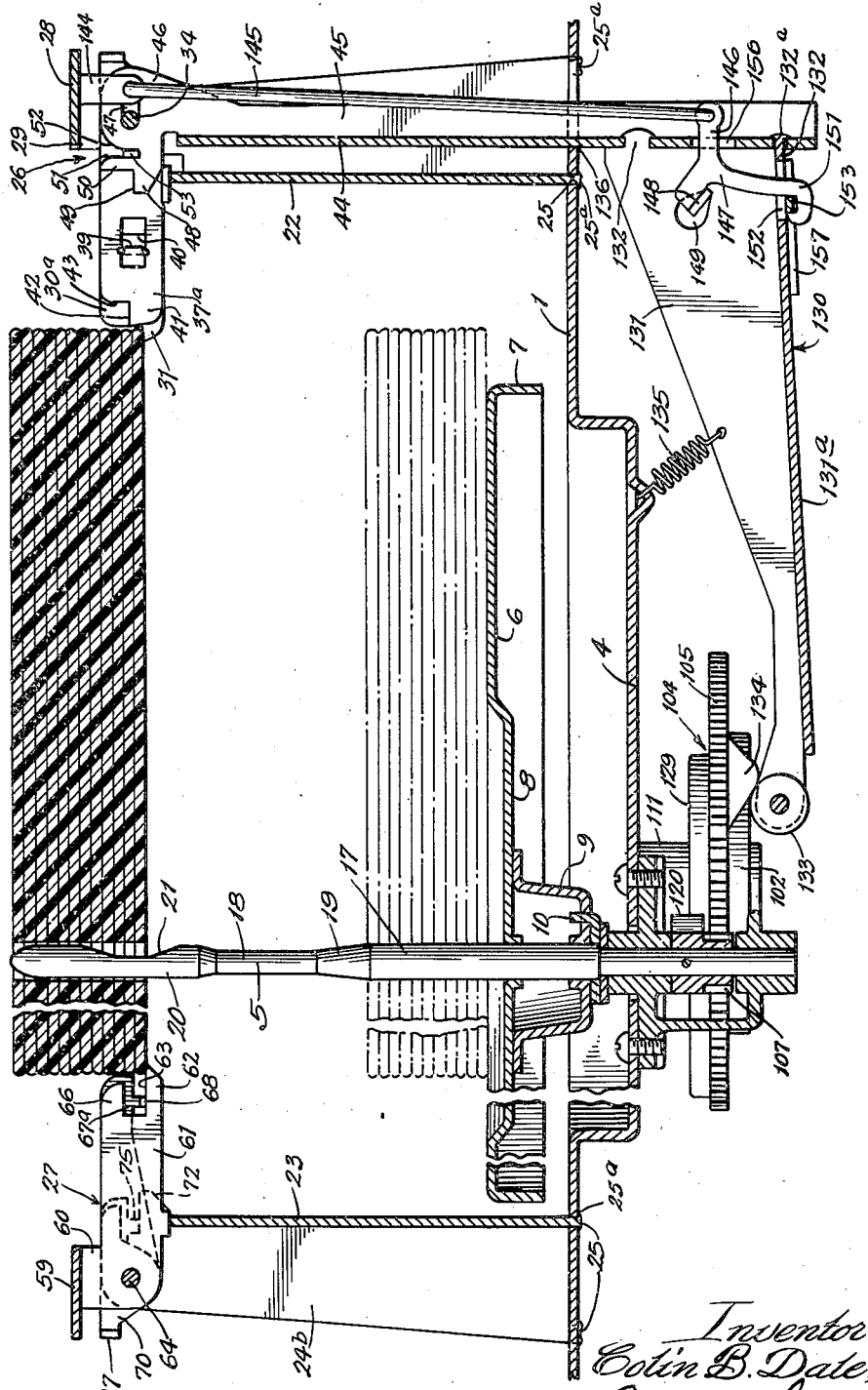
Fig. 5 is a similar view taken on line 5—5 of Fig. 3 showing the machine adjusted for the release of 10-inch record discs.

Figs. 9, 10, and 11 are details of the supplementary supporting mechanism opposite the kick-off showing the margins of 10-inch record discs in section in three stages of the releasing operation;

Fig. 12 is a view of the same mechanism adjusted to co-act with 12-inch record discs;

Fig. 13 is a sectional plan view of the same mechanism taken on line 13—13 of Fig. 9 showing the edge of a 10-inch record disc supported thereon;

Fig. 14 is an exploded perspective view showing the items involved in said mechanisms in their open or disassembled relation;

Fig. 15 is a sectional elevation of the kick-off mechanism taken on line 15—15 of Fig. 7, adjusted to co-act with 10-inch record discs;

Fig. 16 is a similar view of the same mechanism taken on the same section line and adjusted to act with 12-inch record discs;

Fig. 17 is a view of the same mechanism taken on the same section line and in forwardly projected position to effect a kick-off;

Fig. 18 is a sectional plan view of the same taken on line 18—18 of Fig. 15 but with the kicker advanced;

Fig. 19 is an exploded view of the items comprising said mechanisms in their disassembled relation; and Figs. 20, 21, 22, and 23 are sectional elevations of the tone arm spindle and the mechanism provided for elevating the same showing various stages of adjustment.

The operating portions of the machine are carried by a square supporting plate 1 having a flanged edge 2 which fits down over the rim of a hollow box-shaped base 3 which provides an enclosure for the principal operating mechanisms. The supporting plate is dished in its center portion to provide a well 4 through which extends a vertical spindle 5 which is journaled to rotate with the turn-table 6 having a down-turned flanged rim 7. The center portion 8 of the turntable is off-set or dished and carries a cup-shaped bracket 9 which engages an up-turned finger 10 rigid with the spindle, so that the spindle and turntable will rotate in unison. Rotation is imparted to the turntable by a friction wheel 11 (Fig. 7) which contacts the inner side of the rim flange 7 of the turntable and is carried by a swinging arm 12 engaged by a spring 13 which maintains the frictional contact. Rotation is imparted to the friction wheel by a friction roll 14 mounted upon a motor shaft 15 driven by a motor 16 secured to the under side of the supporting plate. These features are conventional and need not be described in further detail.

From inspection of Figs. 4 and 5 it will be noted that the lower portion 17 of the spindle 5 is of enlarged cylindrical formation; and that the intermediate neck portion 18 is of reduced cylindrical formation and connected with the lower portion with a flared shoulder 19. The spindle at its upper end terminates in an enlarged head 20 tapered at its lower extremity and provided on one face with a gouged recess 21 outwardly sloping at its opposite ends. The lower portion of the spindle is of a size to fit somewhat freely through the center aperture of a phonograph record disc, so that when the same is released, it will slide freely down the spindle until it contacts the surface of the turn-table. The upper tip end of the spindle being tapered permits a stack of records to be conveniently mounted upon the upper portion of the spindle in preparation for successive release while the gouged or recessed face of the spindle permits sufficient lateral displacement of the lowermost record disc to accommodate the releasing operation which results in a preliminary tilting down of the initially released edge of the disc as indicated in Fig. 11, while the opposite edge is still supported. The reduced intermediate neck portion of the spindle with its tapered lower end permits the record disc during its fall to assume a level position and become properly centered as it reaches the lower portion of the spindle and makes contact with the turn-table.

The stack of record discs is supported at its opposite edges by the primary and supplemental releasing devices which are mounted respectively upon channel-shaped standards 22 and 23, the formation of which is illustrated in Figs. 19 and 14, respectively. These standards are of identical construction and consist of stampings comprising a body portion 22a and backwardly turned edge flanges 24, 24a, 24b and 24c, which body and flanges in conjunction present their lower edges in butt contact with the surface of the supporting plate and are provided with tongues 25 which are projected through apertures in the supporting plate and upset as at 25a (Fig. 5) to afford a rigid union without the use of extraneous fastening means.

The standard 22 mounts the active kick-off mechanism, which in its entirety is number 26, while the standard 23 mounts the supplemental supporting mechanism, which in its entirety is number 27. The details of the active kick-off mechanism are illustrated in Fig. 19, and it will be understood that the assembly thereshown includes devices of similar construction for selectively supporting either 10-inch discs or 12-inch record discs.

The device for supporting the contiguous edge of a 10-inch record disc, illustrated at the top of Fig. 19 consists of a single stamping comprising a bridge-like body plate 28 having at each side a down-turned neck 29 which merges into an inwardly extending arm 30 or 30a terminating in a supporting finger 31 which affords a ledge 32 for supporting the edge of the record disc. The arms 30 and 30a stand in spaced relation to one another, and at the rear ends of the arms are aligned apertures 33 through which is entered a pintle 34 which affords a pivotal bearing for permitting the supporting device to be swung backwardly from its operative position illustrated in Fig. 2, in which it supports 10-inch discs, to its inactive position shown in Fig. 1 in which 12-inch record discs are being supported.

The pintle 34 is entered through apertures 35 in the upper ends of the flanges 24 of the standard 22, and the side arms 30 of the 10-inch record supporting member lie inside of the flanges 24 and 24a when the parts are assembled. In order to permit the supporting member for 10-inch record discs to be swung past dead center and held in elevated position, laterally extended stop fingers 36 are provided which engage the rear edges of the flanges 24 and 24a when the parts assume the position shown in Fig. 1.

The supporting arms 30 coact with kick-off arms 37 and 37a which lie inside of and in flatwise contact with the supporting arms and have a sliding motion relative thereto. The rear ends of the kick-off arms are provided with elongated slots 38 through which the pintle 34 projects to provide a support for the rear ends of the kick-off arms, while the front ends are guided and supported in co-acting relation with the associated supporting arms by the provision of tongues 39 which are struck outwardly and project through square apertures 40 in the associated arms.

Each of the slidable kick-off arms 37 and 37a is provided with a forwardly projecting finger 41 which affords on off-set ledge 42 backed by the vertical end-edge wall 43 of the kick-off arm. In assembled relation, the ends of the kick-off fingers will occupy a higher elevation than the ledges 32 of the supporting fingers, so that as the kick-off arms are advanced as in Fig. 15, their ends will engage the edge of the lowermost record disc of the stack and displace the same laterally out of engagement with the supporting ledges 32, thereby kicking off and releasing the adjacent edge of the record disc.

At the same time, the ledges 42 of the companion kick-off fingers will pass under the edge of the superposed record disc to afford a support therefor while the lowermost disc is being released until the kick-off fingers are retracted to permit the remainder of the record stack to find support upon the supporting ledges 32.

The in and out movements of the slidable kick-off fingers are imparted by the oscillating movements of a kick-off lever 44 of channel-shaped formation comprising a body 44a having side flanges 45 and 45a which latter at their upper ends terminate in broadened heads 46 and 46a, each having a slot 47 which embraces the pintle 34, which latter affords a guide for permitting limited swinging movements of the upper end of the kick-off lever. The heads 46 and 46a constitute the kick-off mechanism for operation in the release of 12-inch record discs, and to effect this result each of the heads is provided with a forwardly projecting relatively short kick-off finger 48 affording a ledge 49 for the support of the superposed stack of record discs above the lowermost record. The ledge 49 is backed by an upstanding finger 50 behind which is a recess 51 defined on its opposite side by the rounded edge 52 of the head 46. The recess 51 provides for the entry of a tongue 53 struck inwardly from the associated 10-inch kicker arm, so that when the 10-inch record releasing mechanism is swung down to operative position as in Fig. 15, the tongue 53 will enter the slot 51 and thus partake of the forward motion imparted to the kick-off lever. However, when the 10-inch kick-off mechanism is swung upwardly to the position shown in Fig. 16, the parts will be disengaged so that the releasing mechanism for 12-inch record discs will be free to act.

The kick-off fingers 48 for the 12-inch record discs co-act with supporting arms 54 which are hung onto the ends of the pintle 34 outside of the side flanges 24 and 24a of the standard 22. The forward ends of the arms are supported upon tongues 55 which are struck outwardly from the sides of the standard and provide supports for holding the supporting arms in operative position. The reverse swinging of the arms is limited by tongues 56 struck inwardly from the rear ends of the arms in position to engage the rear edges of the side standards of the flanges. Each supporting arm 54 is provided with a forwardly extending finger 57 which affords a ledge 58 adapted to underlie the edge of a 12-inch record disc until the latter has been kicked-off by the advance of the kick-off finger 48.

It will be noted from the above description that the kick-off fingers for the 12-inch record discs partake of each movement imparted by the kick-off lever and transmit said movements to the 10-inch kick-off fingers when the latter are swung down to operative position, so that the same operating mechanism without readjustment is effective to operate in conjunction with record discs of either size.

The opposite edges of the record discs are supported by what has been termed the supplemental or inactive supporting devices illustrated in detail in Figs. 9–14. These mechanisms are carried by the standard 23 at the left of Figs. 1 and 2. For the 10-inch record discs I employ a supporting member comprising a bridge-like body 59 provided at its opposite ends with downturned necks 60 which merge into supporting arms 61 and 61a terminating in forwardly projecting fingers 62 affording ledges 63 for the support of the lowermost record disc of the stack. The bridge-like supporting device is carried by a pintle 64, the ends of which pass through apertures 65, and the supporting device is located between the side flanges 24b and 24c of the standard 23.

Each finger 62 is overhung by a forwardly extending lug 66 which affords a gap of somewhat greater width than the thickness of a standard record disc in order to permit the edge of the record disc to be displaced upwardly as at Fig. 11 as the record disc tilts downwardly when its opposite edge has been released by the kick-off.

Each of the supporting arms 61 and 61a co-acts with what may be termed restraining arms 67 and 67a which are pivoted on the pintle 64 in outside adjacent contact with the associated supporting arms 61 and 61a. Each restraining arm is provided near its free end with a hooked inturned finger 68 which enters the gap between the supporting finger 62 and the lug 66 and affords a stop for limiting the lateral displacement of the lowermost record disc during the releasing operation. The finger, however, is free to lift, to a limited degree, within the gap as the body of the record disc tilts downwardly and the supported edge tilts upwardly as in Fig. 11.

This affords sufficient freedom of movement to permit the record disc to slide free without having its edge clamped or chipped, while at the same time the forward end 69 of the restraining arm affords an abutment for preventing lateral displacement of the superposed record disc of the stack which might occur if the gap above the supporting finger 63 were sufficiently wide to permit free release of the record disc when tilted.

A similar mechanism is provided for supporting and permitting the release of 12-inch record discs. For this purpose, relatively short supporting arms 70 and 70a are provided, each having an aperture 71 to receive the end of the pintle 64 and each provided with a supporting finger 72 and an overhanging lug 73 affording a relatively wide gap to permit the free release of the record discs in the manner previously described. Each supporting arm for 12-inch record discs co-acts with a restraining arm 74 and 74a having a restraining finger 75 similar in function and structure to that previously described. The restraining arms 74 and 74a are provided with apertures 76 to receive the pintle which permits limited lifting movement as the record disc is tilted. Each supporting arm 70 and 70a terminates in an inturned stop lug 77 adapted to limit the back-swinging movement of the supporting arms and associated restraining arms and the arms are supported in their operative position by contact of the lower edge of each supporting arm with an outwardly projecting stop lug 78 on the standard.

In operation when the kick-off mechanism is actuated at an instant while the gouged out face of the record disc spindle stands opposite the kick-off mechanism, the record disc will be displaced laterally with its center hole free to enter the gouged face of the spindle, and its opposite edge will thus be moved inwardly from the position shown in Fig. 9 to the position shown in Fig. 10, in the case of 10-inch record discs; while the superposed record discs will be restrained against lateral movement by the inner ends of the restraining arms. This is due to the fact that the gap afforded by a supporting finger 62 and the overhanging edge of the restraining arm is sufficient only to permit displacement of the lowermost record disc. However, as the opposite edge of the record disc is released by the kick-off, the tilting of the record disc as in Fig. 11 will elevate the ends of the companion restraining arms to widen the gap sufficiently to permit free release of the record disc without interference. Immediately thereafter the restraining arm will drop back to its initial position to reduce the extent of the gap to normal dimensions.

The mechanism for actuating the kick-off, together with the mechanism required in timing the lifting and swinging of the tone arm will now be described.

The tone arm 79 is best illustrated in Fig. 4 from which it will be seen that it is of channel configuration having side flanges 80 and an inner end flange 81 and an outer end flange 82. Near the outer end on the under side is secured a bracket 83 having spaced ears 84 which are pivoted upon a pintle 85 and which straddle the sides of a channel-shaped head 86 carried by a vertical tone arm shaft 87 which passes through the end wall 88 of a standard 89 having side walls 90, the standard being provided with depending lugs 91 which pass through the supporting plate and are upset as at 91a (Fig. 20) and clinched to hold the standard rigidly in position. The lower end of the shaft 87 passes through the supporting plate, and the upper and lower points of contact thus afforded hold the shaft steadily in alignment and permit it to be raised and lowered and swung as occasion may require; and although these guiding points permit swinging, they are not truly to be regarded as bearings, since the weight of the tone arm is imparted in the form of a vertical thrust so that the guide points are not subjected to any appreciable amount of friction.

The tone arm near its pivoted outer end is provided with a depending hooked finger 92 which when the tone arm is in obliquely lowered playing position as in Fig. 4 with the needle 93 resting upon the record groove will lie out of engagement with a hooked stop finger 94 upstanding from the standard 89, the parts being so disposed that an upward thrust imparted to the shaft 87 will elevate the free end of the tone arm to a degree slightly above the horizontal as indicated in dotted lines in Fig. 22. During this elevation, the hooked finger 92 will engage the stop finger 94 and the further thrust of the tone arm shaft will cause the free end of the tone arm to be elevated as indicated during successive stages in Figs. 20-23.

The lifting of the tone arm shaft is effected by the movement of the outer end of a lever of the first order 95, best shown in Fig. 4, which is in the form of a stamping provided with side flanges 96 having apertures 97 for the reception of fulcrum fingers 98 formed on the arms of a hooked bracket 99 secured to the under side of the supporting plate. The inner end of the lever 95 is provided with an up-turned arm 100 carrying a roller 101 held in contact with the edge of a cam flange 102 by the thrust of a spring 103. The cam flange is formed on the under face of a cam disc 104 in the form of a gear wheel having teeth 105 mutilated at the point 106 (Fig. 6) to afford a gap which normally stands in opposed relation to a pinion 107 on the record spindle 17 so that under normal playing conditions, the gear train will be out of mesh, and no movement will be imparted to the cam disc.

In these conditions the roller 101 occupies the elevated position within a cam notch 108 in the cam flange 102, so that under the thrust of the spring 103, the outer end of the lever 95 will be depressed and the tone arm shaft will remain lowered, thereby breaking contact between the hooked finger 92 and the stop finger 94. The lower end of the tone arm shaft is tapered to a point bearing on the end of the lever 95, and this point constitutes the only substantial bearing surface since the weight of the tone arm imparts a direct vertical thrust to the shaft and thus releases the guide openings in the end wall of the standard 90 and in the supporting plate from any appreciable side thrusts so that these contacts constitute guide points rather than bearings in the true sense.

As above stated, the cam disc 104 with its mutilated gear teeth stands idly during the playing operation and until the needle by a gradual movement has reached the end of the low pitched spiral record groove, at which point the needle encounters the steeply pitched terminal groove and initiates a series of movements which result in the engagement of the gear teeth of the cam disc with the constantly rotating pinion, which engagement persists during a single rotation of the cam disc, during which interval all of the adjusting and releasing operations are performed. The mechanism for thus entraining the gear teeth will now be described.

The cam disc is journaled upon a depending stub shaft 109 carried by the supporting plate, and a trip bar (Fig. 6) 110 is provided, the inner end of which lies adjacent the hub 111 of the cam disc and is adapted to have a swinging movement imparted thereto. The trip bar is upwardly off-set at the point 112, and the outer end 113 is apertured to receive the tone arm shaft and rests in frictional contact with the upper horizontal leg 114 of an S-shaped bracket 115, the lower leg 116 of which is inturned to engage the shaft upon which it is rigidly clamped by a set screw 117, the shaft passing three (3) times through the bracket which affords a rigid mounting therefor. The inner end 118 of the trip bar is downwardly off-set and normally rests upon the upper end of a pin 119 carried by the cam disc 104, and the tip end of the bar stands in close proximity to an eccentric block 120 rigid upon the record spindle at a point immediately above the pinion 107.

In the normal playing operation, each rotation of the record disc will move the tone arm inwardly by a minute degree which, through friction, imparts a correspondingly minute inward movement to the inner end of the trip bar and across the end of the pin 119 which movement, however, is insufficient in degree to disengage the bar from the pin so that with each rotation during normal playing, the high point on the eccentric block 120 will kick back the trip bar to its intended position on the pin, and no effective movement of the parts will occur. When, however, the needle encounters the steeply pitched inner spiral groove on the record disc at the end of the playing record groove, the inner end of the trip bar will receive a much augmented movement, sufficient in degree to completely clear the top of the pin which permits the inner end of the trip bar to drop to a position in contact with the side of the pin so that when the high point on the eccentric block next encounters the end of the trip bar, it will cause the bar through contact with the side of the pin to impart sufficient rotation to the cam disc to displace the mutilated area and bring the teeth of the cam disc into mesh with the constantly rotating pinion on the record spindle. The cycle thus initiated will continue through one rotation of the gear disc during which time all readjustments will occur.

The swinging of the tone arm to its outermost position is effected in the following manner. The S-shaped bracket 115 which is fastened to the tone arm shaft co-acts with a bracket 121 having a vertical leg 122, an upper clutch leg 123, and a lower laterally projected crank leg 124 (Figs. 4 and 6). The bracket 121 freely embraces the tone arm shaft, and the clutch leg 123 occupies a position adjacent the obliquely disposed wall 125 which connects the upper and middle legs of the S-shaped bracket 115. In Fig. 4, it will be noted that there is a slight clearance between the edge of the clutch leg 123 and the inner face of the oblique clutch wall 125, but as the S-shaped bracket is lifted, the parts will engage and a clutching contact be established so that a swinging movement imparted to the bracket 122 will be transmitted to the S-shaped bracket which is fast with the tone arm shaft.

Such a swinging movement is imparted by means of a thrust bar 126, the outer end of which is linked through the end of the crank leg 124 (Figs. 4 and 6) while the inner end 127 is bifurcated to straddle the hub 111 of the cam disc. The thrust bar is provided with a roller 128 which engages a cam groove 129 formed on the upper face of the cam disc. In its formation the cam groove is circular throughout one half of its extent while the remaining half is elliptical, which latter portion of the groove is effective in imparting the necessary swinging movements to the tone arm while the circular portion avoids displacement of the out-swung tone arm during the interval other adjustments are occurring.

The means for actuating the kick-off member of the releasing group will now be described.

Referring to Figs. 5 and 15-19, inclusive, it will be noted that the lower end of the kick-off lever 44 projects through the supporting plate and is rigidly connected with an arm 130 of angle plate having tapering side flanges 131 and 131a which are provided with tongues 132 entered through slots in the body wall of the kick-off lever and upset as at 132a to provide a rigid connection therewith.

The inner end of the arm 130 carries a roller 133 which is adapted to be engaged by a hump 134 near the periphery of the cam disc 104 on the under side thereof. At the proper time in the cycle of operation, the arm will be depressed which causes the upper end of the kick-off lever to slide forwardly on the pintle 34, thereby imparting an inward thrust to the kick-off fingers 49 for 12-inch record discs; and when the 10-inch disc releasing device is swung down into operative position, the movement imparted to the head 46 of the kick-off lever will be imparted to the kick-off arms 37. Thus, the same operative mechanism is employed for effecting the release either of 10-inch record discs or 12-inch record discs as the case may be.

The arm 130 is normally held elevated by a spring 135, so disposed as to impart an inward, upward pull on the arm which holds the upstanding kick-off lever in contact with the supporting plate at the point 136 which thus constitutes a fulcrum point for permitting the rocking of the lever under the timing of the cam.

After a record disc has been released and dropped to its lowermost position, it is necessary to swing the tone arm inwardly to a sufficient degree to bring the needle into overlying relation to the outer end of the record groove. This is accomplished by the elliptical configuration of the cam groove 129, but in order to prevent the tone arm from being swung inwardly beyond the intended point, stop mechanism, adjustable either for 10-inch or 12-inch record discs, is provided which is particularly illustrated in Fig. 6. The adjustable stop mechanism is in the form of a stop plate 137 which is pivoted at the corner 138 to the supporting plate and guided for swinging movements by the provision of a pin and slot assembly 139. The free end of the stop plate is provided with an outstanding stop edge 140 adapted to afford an abutment for limiting the inswinging of the tone arm when co-acting with 12-inch record discs, and an inwardly offset stop edge 141 adapted to permit a more extended inward swing of the tone arm when operating with 10-inch record discs. The stop plate co-acts with a button 142 carried by an arm 143 which projects inwardly from the middle leg of the S-shaped bracket 115. When the stop plate 137 is adjusted as shown in Fig. 6, the button 142 will engage the outstanding stop edge 140 and hold the tone arm in position to be lowered to bring the needle into engagement with the 12-inch record discs; but when the plate is swung to the right in Fig. 6, the button will be permitted a more extended inward swing to bring the tone arm into playing relation with a 10-inch record disc.

This stopping of the tone arm is permitted by reason of the fact that frictional contact alone between the bracket leg 123 and the clutch surface 125 (Fig. 4) is relied upon to impart the necessary swinging movements so that slippage is permitted after the tone arm has assumed its intended position.

The cycle is completed after a single rotation of the cam disc which brings the roller 101 again into registry with the cam notch 108 which lowers the end of the lever 95 and with it the tone arm shaft 87, so that the tone arm will thereafter be free to gradually travel inwardly by the contact of the needle 93 with the record groove. In order to synchronize the adjustment of the stop plate 137 with the kick-off mechanism when adjusted to play record discs of the intended size, the following mechanism is provided.

Referring to Fig. 5, the bridge 28 of the 10-inch record supporting device is provided with a struck-down tongue 144 which is engaged by the hooked upper end of a link 145, the lower end of which is hooked in to the middle leg 146 of a bell crank lever 147 (Fig. 5) provided with a fulcrum finger 148 engaging the edge of an aperture 149 in the side wall 131 of the lever arm 130. The bell crank leg 146 operates through a slot 150 in the wall of the kick-off lever 44, and the bell crank is provided with a lower hooked leg 151 operating through a slot 152 in the wall 131a, which engages an ear 153 on a similarly conformed bell crank lever 154 (Fig. 6), which bell crank lever is provided with an inturned finger 155 fulcrumed through an aperture 156 in the side wall 131a.

The lower leg 157 of the bell crank engages a link 158, the opposite end of which is hooked through the stop plate 137, a spring 159 being provided to resist the pull of the link 145. The arrangement is such that when the 10-inch record supporting device is thrown back into its upstanding or inoperative position as in Fig. 16, the link 145 will be drawn upwardly which will impart a thrust to the link 158, thereby holding the stop plate 137 in the position shown in Fig. 6, which brings the outstanding stop edge 140 into the path of the button 142, thus limiting the inswinging of the tone arm to the extent necessary to engage the periphery of a 12-inch record.

Conversely when the 10-inch record releasing kick-off mechanism is swung down into the operative position shown in Fig. 15, the link 145 will be thrust downwardly against the tension of the spring 159, thereby imparting a pull to the link 158 for readjustment of the stop plate to the proper position to permit engagement of the button 142 with the stop edge 141. The tone arm will thus be held in the proper position near the periphery of the selected record discs during the completion of the adjusting cycle and the lowering of the tone arm, after which the tone arm, being released from frictional clutch engagement will be free to follow the record groove.

*Operation*

The operation may be briefly summarized as follows. The motor through a frictional transmission will impart constant rotation to the turntable and to the spindle for centering the record discs, and the rotation thus imparted to the spindle will afford the necessary power for imparting a single rotation to the gear cam disc during the release of a record disc. During the normal playing of a record disc, the constantly rotating pinion 107 will rotate within the gap 106 in the cam gear disc, and the meshing of the teeth is prevented by the support afforded the trip bar 110 by the upper end of the pin 119.

This support will be maintained by the kicking back of the trip lever by repeated contacts of the eccentric block 120 on the record spindle until the needle has reached the end of the low pitched record groove, at which point the high-pitched inner spiral groove on the disc will impart a relatively rapid inward terminal swing to the tone arm which moves the end of the trip lever entirely out of contact with the pin 119 so that the eccentric block will thereafter impart sufficient rotation to the cam disc to cause a meshing of its teeth with the pinion 107, and this meshing will continue throughout a substantially complete rotation of the disc and until the mutilated gap again comes into adjacent relation to the pinion.

The first operation in the cycle will impart an upward thrust to the tone arm shaft 87 which elevates the free end of the tone arm and thereafter the bifurcated bar 126 will impart a thrust to the crank leg 124 of the freely mounted bracket 122. The initial lifting of the tone arm shaft has established frictional clutch relation between the S-shaped bracket 116 and the leg 123, so that the swinging movement imparted to the S-shaped bracket will be effective in imparting a partial rotation to the tone arm shaft sufficient to swing the tone arm to its outermost position in preparation for the release of a new record.

With the parts thus adjusted, the upper end of the kick-off lever 144 will be swung inwardly and the selected kick-off mechanism will be actuated. If 10-inch record discs are being played, the kick-off fingers 37 will be thrust inwardly in unison, thereby displacing the near edge of the 10-inch record disc and simultaneously providing support for the superposed discs in the stack.

Similarly if 12-inch discs are being released, the kick-off fingers 48 will perform a like operation.

With the near side of the lowermost disc displaced laterally inward and released, its opposite edge will be tilted up as in Fig. 11 which will slightly lift the restraining finger 68 and enlarge the clearance afforded for the final release of the disc. A similar function will be performed by the restraining finger 75 in the case of 12-inch discs. After the release and deposit of the disc, the tone arm will be swung inwardly to a sufficient extent to overlie the periphery of the newly deposited disc and thereafter the final lowering of the tone arm will bring the needle into engagement with the outer terminus of the record groove.

The connections previously described insure proper co-action between the selected releasing mechanism and the stops for the initial inswinging of the tone arm to insure proper registry of the needle with the record groove of a disc of the intended size.

The invention as a whole is one which combines extreme simplicity in construction and method of fabrication with adequate provision to insure proper functioning of the parts under all conditions of operation. Although the invention has been described with full particularly as to detail, it is not the intention to limit the invention to the details as shown, since various modifications in the shaping and arrangement of the parts may be made without departing from the spirit of the invention.

I claim:

In a disc-changing phonograph, support and feed means for a stack of record discs to be played including edge supporting means having a part shiftable between two positions to adapt the edge supporting means to receive large and smaller discs respectively, a first kicker associated with the edge supporting means and movable inwardly and outwardly with respect to the edge supporting means to shift a large disc resting on said supporting means, automatic means for moving said kicker, and a second kicker shiftable inwardly and outwardly with respect to the edge supporting means and arranged in a position to be engaged by the first kicker and moved by it to move a smaller disc resting on the edge supporting means; the shiftable part of the edge supporting means and the kickers each including a plate, the second kicker and said plate of the edge supporting means being constantly interlocked for joint pivotal movement by a slot in one and a lug on the other fitting therein for movement in a given direction, and the kickers, when in cooperative relation, being interlocked by an open-ended slot in one disposed at an angle to said direction and a lug on the other moved into said slot by the pivotal movement of the second kicker.

COLIN B. DALE.

REFERENCES CITED

The following references are of record in the file of this patent:

UNITED STATES PATENTS

| Number | Name | Date |
|---|---|---|
| 1,991,005 | Whitman | Feb. 12, 1935 |
| 2,280,685 | Carson | Apr. 21, 1942 |
| 2,284,305 | Slade | May 26, 1942 |
| 2,286,490 | Knox | June 16, 1942 |
| 2,298,988 | Todd | Oct. 13, 1942 |
| 2,299,633 | Knox et al. | Oct. 20, 1942 |
| 2,300,668 | Habegger | Nov. 3, 1942 |
| 2,328,641 | Glaser | Sept. 7, 1943 |
| 2,331,383 | Faulkner | Oct. 12, 1943 |
| 2,371,362 | Small | Mar. 13, 1945 |